(12) United States Patent
Boyer

(10) Patent No.: US 7,677,766 B2
(45) Date of Patent: Mar. 16, 2010

(54) LED LAMP DEVICE AND METHOD TO RETROFIT A LIGHTING FIXTURE

(75) Inventor: John Delmore Boyer, Lebanon, OH (US)

(73) Assignee: LSI Industries, Inc., Cincinnati, OH (US)

( * ) Notice: Subject to any disclaimer, the term of this patent is extended or adjusted under 35 U.S.C. 154(b) by 215 days.

(21) Appl. No.: 11/745,126

(22) Filed: May 7, 2007

(65) Prior Publication Data

US 2008/0278955 A1    Nov. 13, 2008

(51) Int. Cl.
*F21V 29/00* (2006.01)
(52) U.S. Cl. .................. 362/294; 362/373; 362/249.02
(58) Field of Classification Search .............. 362/249, 362/252, 294, 345, 373, 545, 800, 249.02
See application file for complete search history.

(56) References Cited

U.S. PATENT DOCUMENTS

| | | | |
|---|---|---|---|
| 2,483,876 A | 10/1949 | Boyer | |
| 3,027,481 A | 3/1962 | Thompson et al. | |
| 3,808,081 A | 4/1974 | Okuhara et al. | |
| 4,104,711 A | 8/1978 | Carter | |
| 4,521,836 A | 6/1985 | Puttemanns et al. | |
| 4,763,233 A | 8/1988 | Poyer | |
| D413,997 S | 9/1999 | Jandrisits et al. | |
| 6,082,878 A | 7/2000 | Doubek et al. | |
| 6,425,678 B1 | 7/2002 | Verdes | |
| D465,046 S | 10/2002 | Layne et al. | |
| 6,480,389 B1 | 11/2002 | Shie | |
| 6,739,734 B1 | 5/2004 | Hulgen | |
| 6,773,138 B2 * | 8/2004 | Coushaine | 362/656 |
| 6,779,908 B1 | 8/2004 | Ng | |
| 6,787,999 B2 | 9/2004 | Stimac | |
| 6,905,227 B2 | 6/2005 | Wu | |
| 6,964,499 B2 | 11/2005 | Colip et al. | |
| 6,982,517 B2 | 1/2006 | Chou | |
| 6,982,518 B2 | 1/2006 | Chou et al. | |
| 7,075,224 B2 * | 7/2006 | Coushaine | 313/498 |
| 7,093,958 B2 | 8/2006 | Coushaine | |
| 7,111,963 B2 | 9/2006 | Zhang | |
| 7,166,955 B2 * | 1/2007 | Coushaine et al. | 313/46 |
| D541,957 S | 5/2007 | Wang | |
| D558,378 S | 12/2007 | Rashidi | |
| 2002/0093820 A1 | 7/2002 | Pederson | |
| 2005/0024870 A1 | 2/2005 | Coushaine | |

(Continued)

*Primary Examiner*—Thomas M Sember
(74) *Attorney, Agent, or Firm*—McDermott Will & Emery LLP

(57) ABSTRACT

A device and method for retrofitting a light fixture from use with a lamp socket that employs a conventional incandescent or metal halide lamp, to use with a light emitting diode (LED)-based lamp assembly. The lamp fixture has a collar with a base and an annular outer wall extending out from the base. The LED lamp device includes a neck base having an annular outer wall having a shaped outside surface that is placed into direct surface contact with the inner surface of the annular outer wall of the collar, to establish an effective heat-transferring interface. The shaped outer surface of the neck base provides proper fitting of the LED lamp device into the lighting fixture, and provides a heat-transferring interface over substantially all of the outer surface of the neck base, to dissipate heat away from the LED module. Aluminum material provides high thermal conductivity, light weight, availability, and low cost.

5 Claims, 20 Drawing Sheets

U.S. PATENT DOCUMENTS

| | | |
|---|---|---|
| 2005/0052864 A1 | 3/2005 | Colip et al. |
| 2006/0012997 A1 | 1/2006 | Catalano |
| 2006/0109640 A1 | 5/2006 | Fong |
| 2007/0008723 A1 | 1/2007 | Hampton |
| 2007/0230172 A1 | 10/2007 | Wang |
| 2008/0186704 A1* | 8/2008 | Chou et al. .................. 362/249 |

* cited by examiner

LED LAMP DEVICE AND METHOD TO RETROFIT A LIGHTING FIXTURE

BACKGROUND OF THE INVENTION

Outdoor lighting has evolved over the years from the earliest use of incandescent lamps, through the use of fluorescent, high intensity discharge (HID), and mercury-vapor lamps, and more recently to light emitting diode (LED) lamps. LED lamps offer several advantages, including improved quality, performance, lifespan and cost, and their use and popularity have been growing. LED lighting also provides, and has the potential for further providing, reduced power consumption per unit lumen.

One drawback of LED lighting systems is the cost and inconvenience of removing conventional, non-LED-based light fixtures and installing new light fixtures that are design and optimized for LED-based lamps. To defray this expense, attempts have been made to retrofit, or force-fit, LED lamp technology into non-LED lamp fixtures. Examples include the incorporation of LED lamps inside and on the outside surface of "bulb" style lamps, with threaded electrical connections so that the LED bulb lamp can be screwed into a conventional socket.

An alternative means for retrofitting LED lamps into a conventional light fixture is to replace both the conventional bulb and the electrical socket with an LED lamp assembly which incorporates or is augmented with a suitable power and control systems for LED service. Nevertheless, such retrofitting efforts often fail to address one or more of the functional differences characteristic of LED lamps. In particular, LED lamps are sensitive to heat generated by the LED itself, and may loose efficiency unless the heat and local temperature increases are minimized. LED lamps are also well known to emit light in a lambertian distribution, whereas most conventional incandescent and fluorescent lamps emit a spherical light pattern. Positioning and controlling the light emitted from an LED requires a different technique than the light from a conventional lamp. Furthermore, typical power convertors that convert off-line (110-377V AC) to 24V, constant current to drive the LEDs, are bulky and do not conveniently install into such socket-type light fixtures.

Therefore, there remains a need to provide improved and effective means for retrofitting LED lamps into conventional light fixtures, and for new light fixtures, which provide for efficient and effective power consumption and utilization of the light emitted from the LED lamps.

SUMMARY OF THE INVENTION

The present invention relates to a device and method for retrofitting a light fixture from use with a lamp socket that employs a conventional incandescent or metal halide lamp powered by off-line voltage, to use with a light emitting diode (LED)-based lamp assembly. The conventional non-LED lamp fixture is of a type having a collar that has a base and an annular outer wall extending out from the base. The base of the lamp fixture is securable to a structure, such as a pole, canopy, or wall. The LED lamp device has an annular outer wall having a shaped outside surface that is placed into direct surface contact with the inner surface of the annular outer wall of the collar, to establish an effective heat-transferring interface between the LED lamp device and the collar, and a means for affixing an LED module comprising at least one LED.

The material of construction of the LED lamp device is typically a metal or engineering plastic having a high thermal conductivity. Metals are typically selected from aluminum, copper, brass, bronze, iron and steel. Aluminum is particular attractive for its high thermal conductivity, light weight, availability, and low cost. The shaped outer surface of the LED lamp device provides proper fitting of the LED lamp assembly into the lighting fixture, and provides a heat-transferring interface over substantially the entire outer surface of the adapter sleeve, to dissipate heat away from the LED module and its power and control units.

The LED lamp module includes a light board 81 to which is affixed one or a plurality of LEDs, and optionally LED power and control components.

The means for affixing the LED module to the LED lamp device is generally disposed at the distal end, and typically is a recess formed in the distal end within which the LED module is positioned. Typically, a protective lens or transparent plate is positioned over the recessed LED module for protection from the environment and for personnel safety. Power wiring from the LED module to a power source is typically routed through openings in the LED lamp device and collar.

The present invention also relates to the above-mentioned LED lamp device.

The LED lamp device, and its use in a retrofitable retrofitting light fixture, can comprise an adapter sleeve having the annular outer wall with the shaped outside surface, and 2) a lamp head moveably affixed to the adapter sleeve that comprises a means for affixing the LED module. Typically the lamp head has an annular base portion having a proximal rim that associates with a shoulder on the annular wall of the adapter sleeve both to provide a broad contact interface for conducting heat through and away from the lamp head to the adapter sleeve, and to permit movement, typically rotation, of the lamp head with respect to the adapter sleeve, and more typically so that the LED module revolves around an axial centering line of the adapter sleeve. The LED module has a centerline disposed at an angle from the axial centering line of the adapter sleeve of from about 10° to about 70°.

The LED lamp device can be configured with modular design features, such that the LED lamp device of the first embodiment can also be used as the adapter sleeve, configured with the shoulder on the annular wall so that a separate lamps head can be added for modifying the direction and distribution of the LED light, as well as the appearance of the LED lamp device itself.

The present invention further relates to a method for retrofitting an existing lamp fixture to replace a threaded lamp socket with an LED-based lamp assembly, the lamp fixture having a collar having an annular wall with an inner wall surface, and a base to which the threaded lamp socket is secured for attaching the lamp fixture to the structure, and for communicating electrical power from an electrical power source to the threaded socket lamp, the method comprising the steps of: a. removing the threaded lamp socket from the collar; b. providing an LED lamp device having an annular wall having a shaped outside annular surface and an LED module; c. affixing the LED lamp device to the lamp fixture, wherein the shaped outside annular surface is placed into direct surface contact with the inner surface of the annular wall of the metallic collar, to establish a heat-transferring interface between the adapter sleeve and the collar, and d. connecting the electrical power source to the LED module.

The invention also relates to the ornamental shape and design of the LED lamp device.

DETAILED DESCRIPTION OF THE INVENTION

Figure 1:
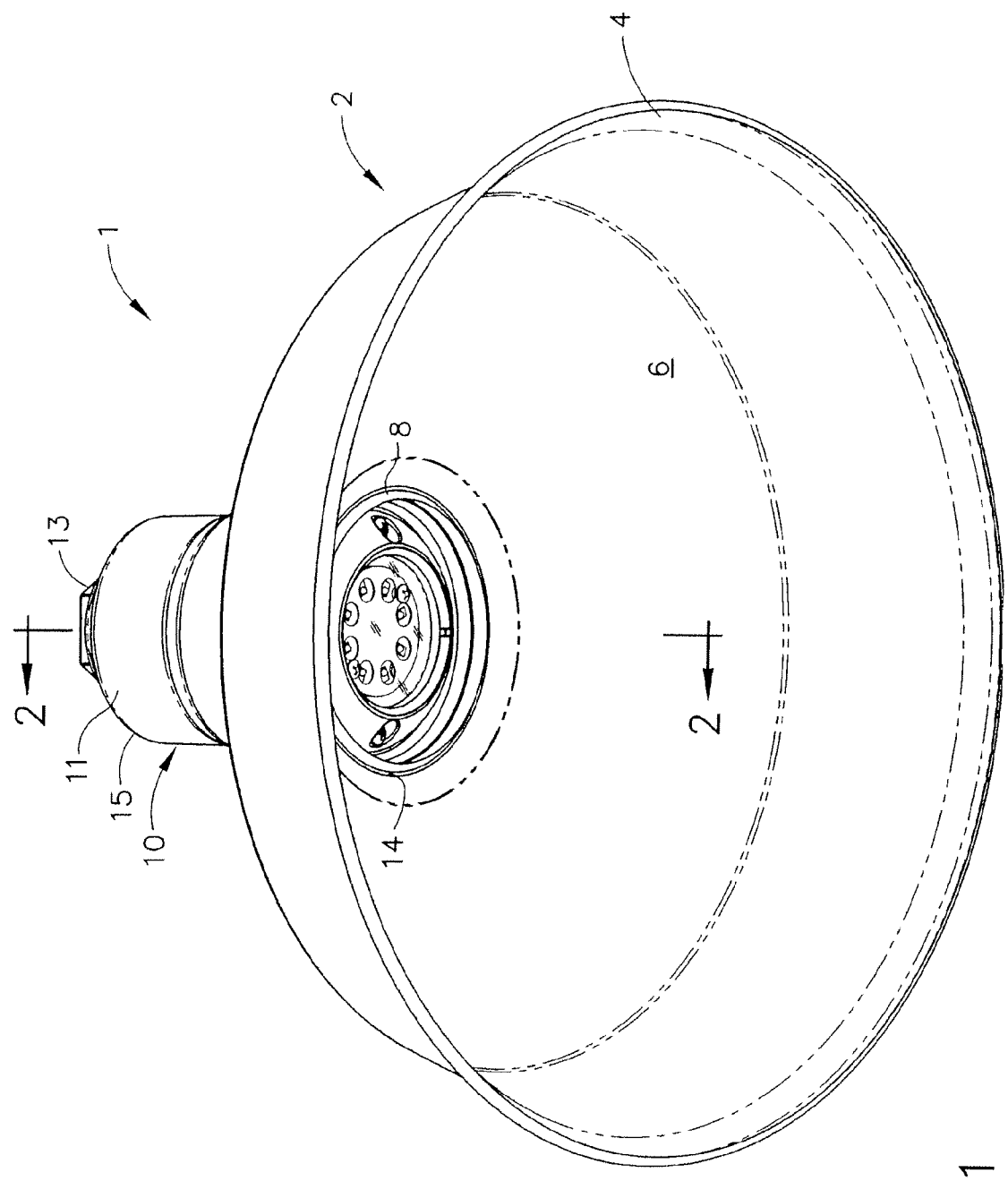
FIG. 1 shows a perspective view of a light fixture having an LED lamp device with an LED light module.
Figure 2:
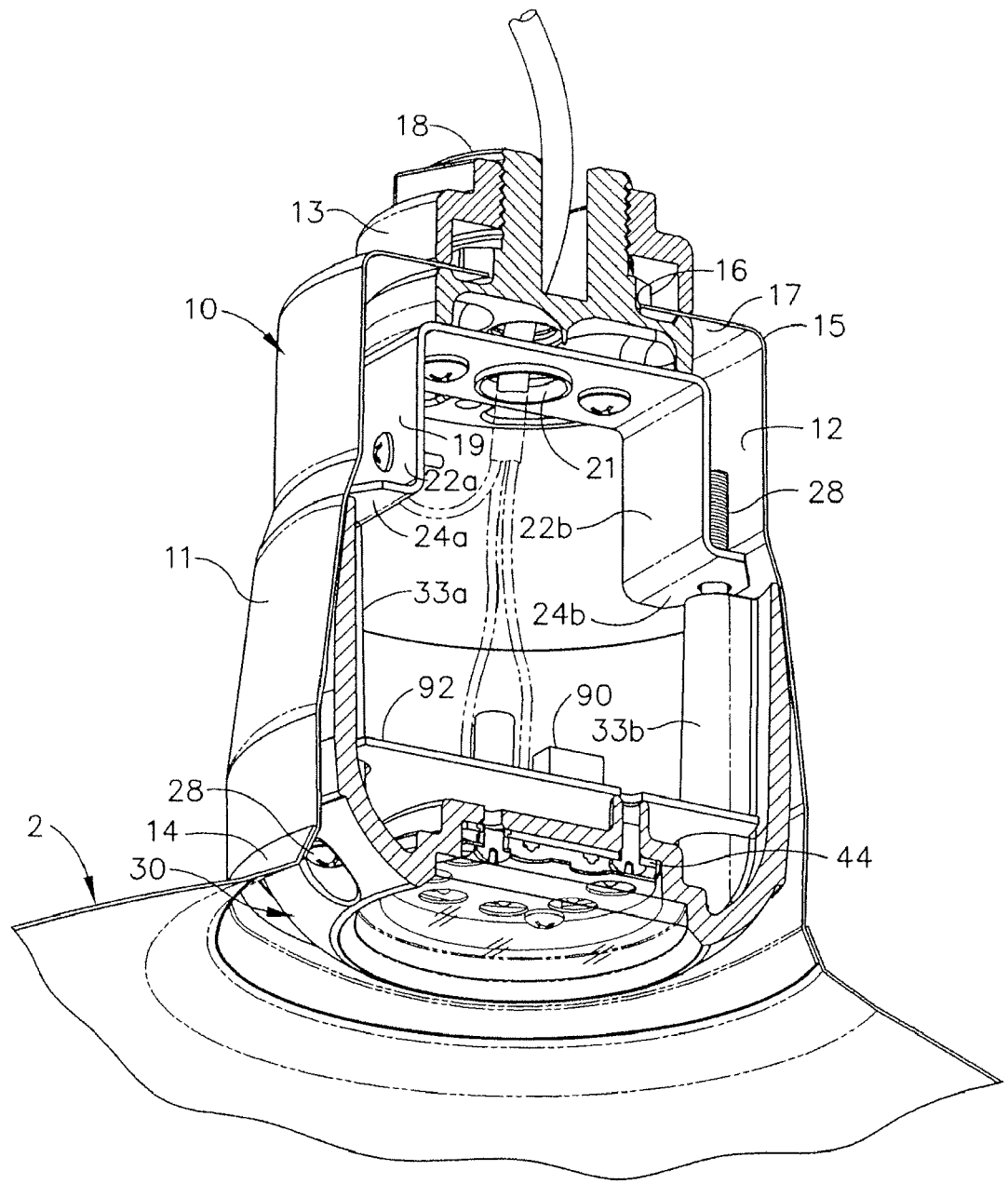
FIG. 2 shows a sectional view of the light fixture and LED lamp device taken through line 2-2 of FIG. 1.

A typical LED-based lamp fixture is shown in FIGS. 1 and 2. The light fixture 1 includes a shade 2 and a collar 10. The shade 2 has a frustoconical shade wall 6 that defines a distal rim 4 and a proximal rim 8 that associates with the collar 10. The collar 10 has an annular outer wall 11 having an inner surface 12. The outer wall 11 is generally a cylindrical shape, though more typically having one or more sidewall portions that taper outwardly from a proximal end 15 to the distal end. The shade 2 is typically fixed to the outer distal rim 14 of the collar 10.

As shown in FIG. 2, the base 17 located at the proximal end 15 of the collar has an opening 16. The securing means is shown as an adapter 18 that extends through the opening 16 of the base 17 of the collar, and has an opening there through and a first end. The first end is secured, such as with threads, to an electrical conduit or cord (not shown) associated with the structure, such as a light pole, fence, and building wall, ceiling or roof (not shown). A nut 13 threads onto the outside threads of the adapter 18 to secure the base 17 of the collar 10 to the adapter 18 and to the structure. A collar bracket 19 is secured to the adapter 18, using screws or equivalent means. An opening 21 passing through the collar bracket 19 and the opening in the adapter 18 provide access for electrical power wiring to within the light fixture. The collar bracket also has a pair of distally extending arms 22a and 22b disposed on opposite sides of the opening 21, leading to respective tabs 24a and 24b.

The shade 2 and collar 10 are typically made of metal, such as aluminum or steel, or engineering plastic, that can efficiently conduct heat to the surrounding air, and typically have a thermal conductivity of at least 50 W/mK, or typically at least 200 W/mK.

Figure 3:
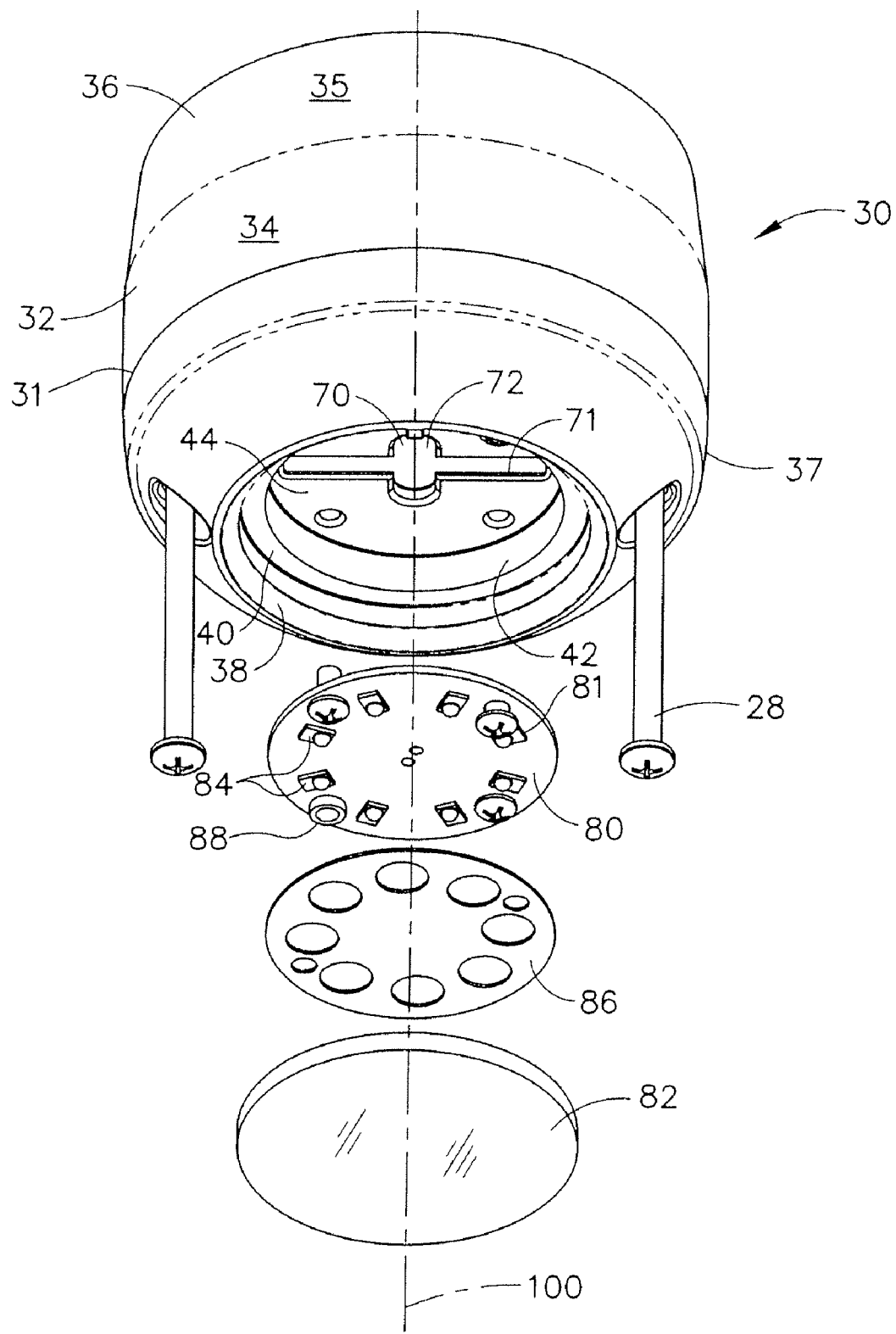
FIG. 3 shows an exploded view of the LED lamp device.
Figure 4:
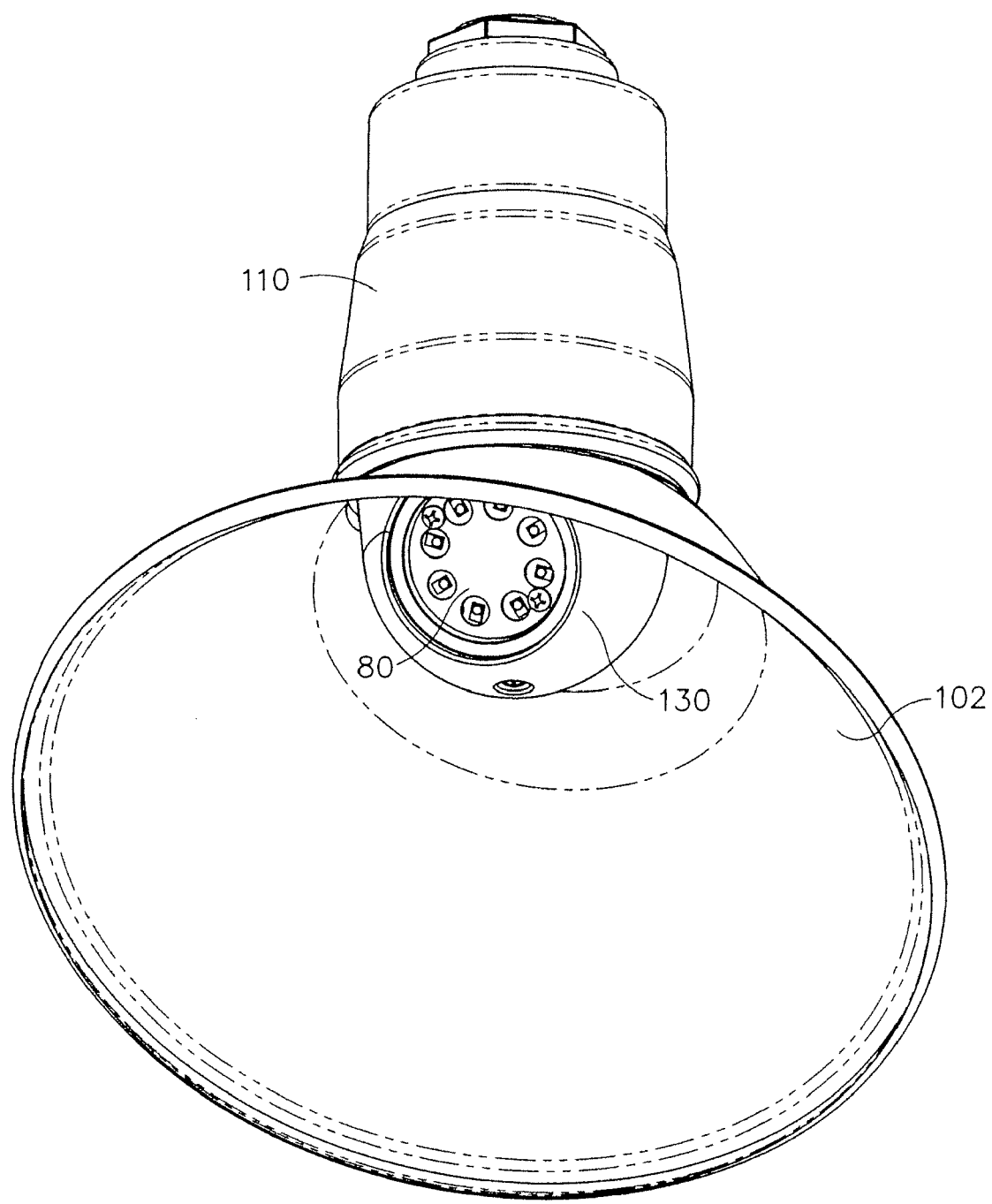
FIG. 4 shows a perspective view of a light fixture having a second embodiment of the LED lamp device.

Disposed within the light fixture 1 is an LED lamp device 30. FIG. 3 shows the LED lamp device 30 after the shade 2 and collar 10 are removed in order to better illustrate the embodiment. The illustrated LED lamp device 30 has a neck base 31 having an annular wall 32 having a shaped outside surface 34 that is placed into direct surface contact with the inner surface 12 of the annular wall of the collar 10, to establish a heat-transferring interface between the LED lamp device 30 and the collar 10. The neck base 31 also has a recess 44 within which is disposed an LED module 80 that comprises an LED light board 81 to which is secured at least one LED 84.

A securement, such as a threaded bolt 28, extends through flanges 33a, 33b to secure the LED lamp device 30 to the tabs 24a,b of the adapter 19. The annular wall 32 has a proximal annular rim 36 that extends down proximate the outer wall 11 of the collar 10. The proximal portion 35 of the outer surface 34 of the wall 32 that extends toward the rim 36 is configured and shaped to be placed into direct surface contact with the inner surface 12 of the annular wall 11 of the collar 10, whereby a heat-transferring interface is established between the LED lamp device 30 and the collar 10. The intimate, near continuous contacting surfaces of the annular wall 32 of the neck base 31 and annular wall 11 of the collar 10 provides effective heat transfer to dissipate the heat generated by the LED power source and controllers. The particular annular wall 32 is shown with a proximal outer surface 35 that is tapered or angled approximately between −5° and +10°, more typically between 1° and 5°, from vertical toward the centerline, though other surface taper properties can be formed or machined into the adapter sleeve to form the intimate surface contact with the inner surface of the collar.

At the distal end of the neck base 31 is shown a pair of concentric, nested recesses 40 and 44, disposed substantially centered on the centerline 100. The outer recess 40 defines an upper annular sidewall 38 and the inner recess 44 defines a lower annular sidewall 42. The inner recess 44 is sized to retain the LED light board 81. In the floor of the recess 44 is an opening 70 through which pass electrical wiring for power and control of the LEDs. The opening 70 is preferably formed as an elongated slot 71 having a length and a width sufficiently sized to allow passing there through the LED light board 81. In another embodiment of the LED lamp device 30, the opening has at least one secondary slot 72 extending transversely from a middle portion along the length of the elongated slot 71, that permits passage of the control wiring that extends normal to the PCB of the LED light board 81.

Typically the inner recess 44 is a circular shape, though other shapes can be used. The recess 44 can also be offset from the centerline 100 as desired. The outer recess 40 generally overlays the inner recess 44, and retains a lens or transparent plate 82 through which the light from the LEDs 84 can emit. The lens 82 protects the LEDs and the electronics from the environment and provides personnel safety. The lens 82 is typically secured within the recess 40 with adhesive or other well known securing means.

The LED light board is typically a printed circuit board (PCB) on which is mounted one or a plurality of LEDs, as is well known in the art. The circuitry for controlling and powering the LEDs can also be mounted on the PCB, or remotely. The LEDs can be of any kind and capacity. They can emit colored or white light; they can have an optic built-in with the LED or placed over the LED, or no optic; and they can have a surrounding reflector that re-directs low-angle LED light. In one suitable embodiment, the LEDs 84 are white LEDs each comprising a gallium nitride (GaN)-based light emitting semiconductor device coupled to a coating containing one or more phosphors. The GaN-based semiconductor device emits light in the blue and/or ultraviolet range, and excites the phosphor coating to produce longer wavelength light. The combined light output approximates a white output. For example, a GaN-based semiconductor device generating blue light can be combined with a yellow phosphor to produce white light. Alternatively, a GaN-based semiconductor device generating ultraviolet light can be combined with red, green, and blue phosphors in a ratio and arrangement that produces white light. In yet another suitable embodiment, colored LEDs are used, such are phosphide-based semiconductor devices emitting red or green light, in which case the LED module 80 produces light of the corresponding color. In still yet another suitable embodiment, the LED light board includes red, green, and blue LEDs distributed on the PCB in a selected pattern to produce light of a selected color using a red-green-blue (RGB) color composition arrangement. In this latter exemplary embodiment, the LED light board can be configured to emit a selectable color by selective operation of the red, green, and blue LEDs at selected optical intensities.

The LED lamp device 30 typically receives an external power supply having an off-line voltage of 110-277 V, depending upon the local power system. In one embodiment, an external low voltage power system can be provided that converts the off-line voltage of 110-277 V AC from the structure to the 24V constant current required for the LED power and control components of the LED light board 81. In another embodiment, the LED lamp device is configured for installation of an integral LED power and control module 90, which converts off-line power directly to the low voltage constant current power required by the LEDs. The conventional drivers and controllers of LED boards are routinely powered with 24V constant current, which is supplied by separate off-line power converts which are generally bulky, elongated and ill-suited for incorporation into such conventional light fixtures. The components of the LED power and control module 90 can be assembled on a board or substrate 92 that can be secured within the neck base 31, as shown in FIG. 2, with the substrate 92 inboard and in heat-conducting contact with the floor of inner recess 44.

In another embodiment of the invention, the neck base 31 containing the LED power and control module 90 can be filled with an electrical potting compound, such as epoxy to complete encase the components. The potting provides several benefits, including a water and corrosion barrier, component shock absorption, and a heat sink for dissipating and removing heat generated by the LED power and control module 90.

FIG. 3 shows a cover plate 86 having a plurality of opening that register over the LEDs 84 to allow light transmission. A spaced ring 88 is used to stand off the cover plate 86 from the LED light board 81 and to control the positioning of the edges of the openings in the cover plate 86 from the LEDs 84. The cover plate can be made from a reflective material or have a reflective coating, or other decorative pattern, which also serves to disguise the electronic circuitry of the LED light board 80.

In another alternative embodiment, a control means for dimming the light output can be provided, either as an external control means associated with the structure, or an internal control means built into the LED lamp device with control wiring passing externally to the structure.

Various types, sizes and shapes of such lamp fixtures are known, though each generally provides a collar that conventionally retains and houses, in a retrofitted lamp fixture embodiment, the threaded socket of the incandescent lamp.

Figure 5:
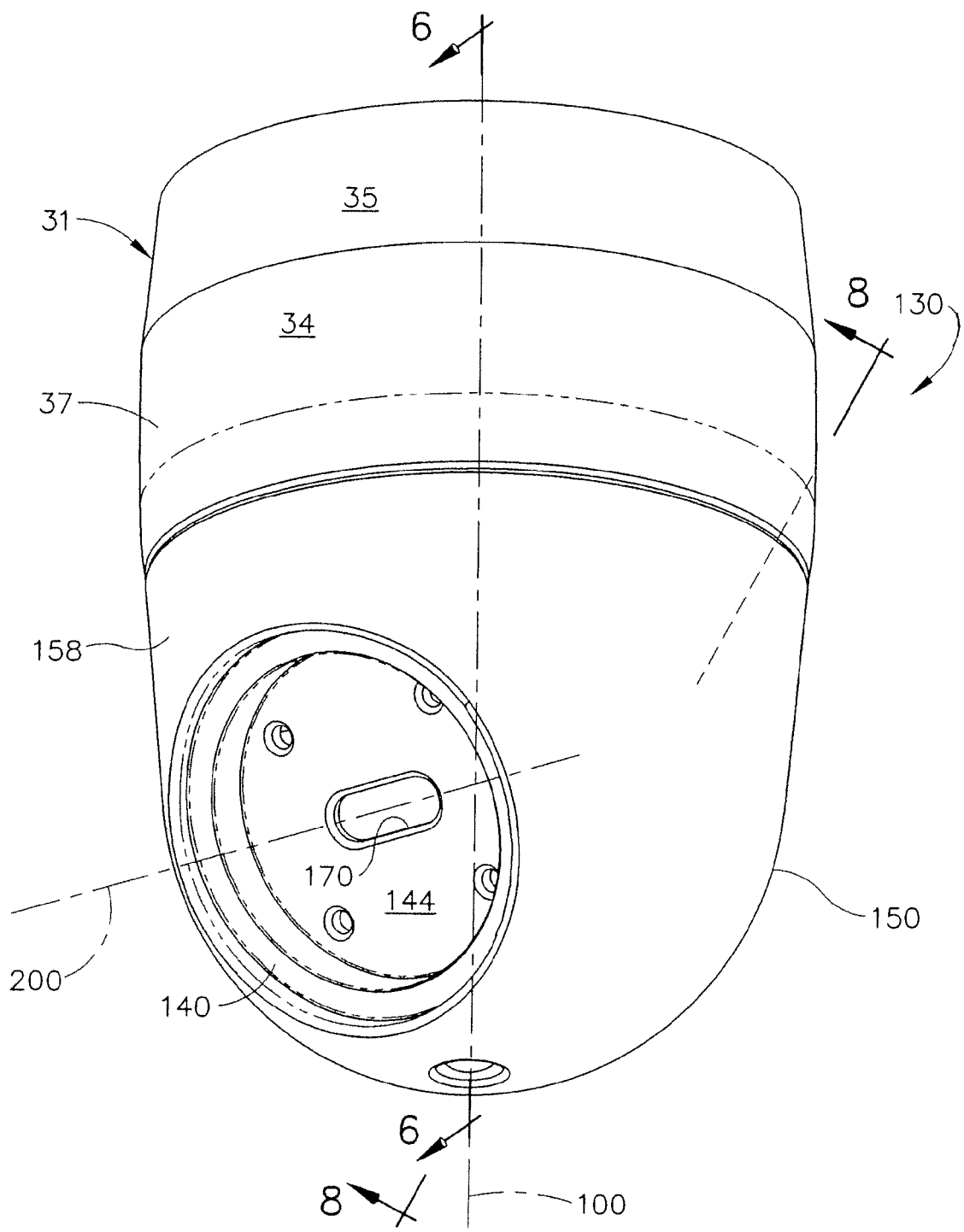
FIG. 5 shows a perspective view of the LED lamp device of FIG. 4 isolated from the light fixture and the LED module, showing a neck base and a lamp head.
Figure 6:
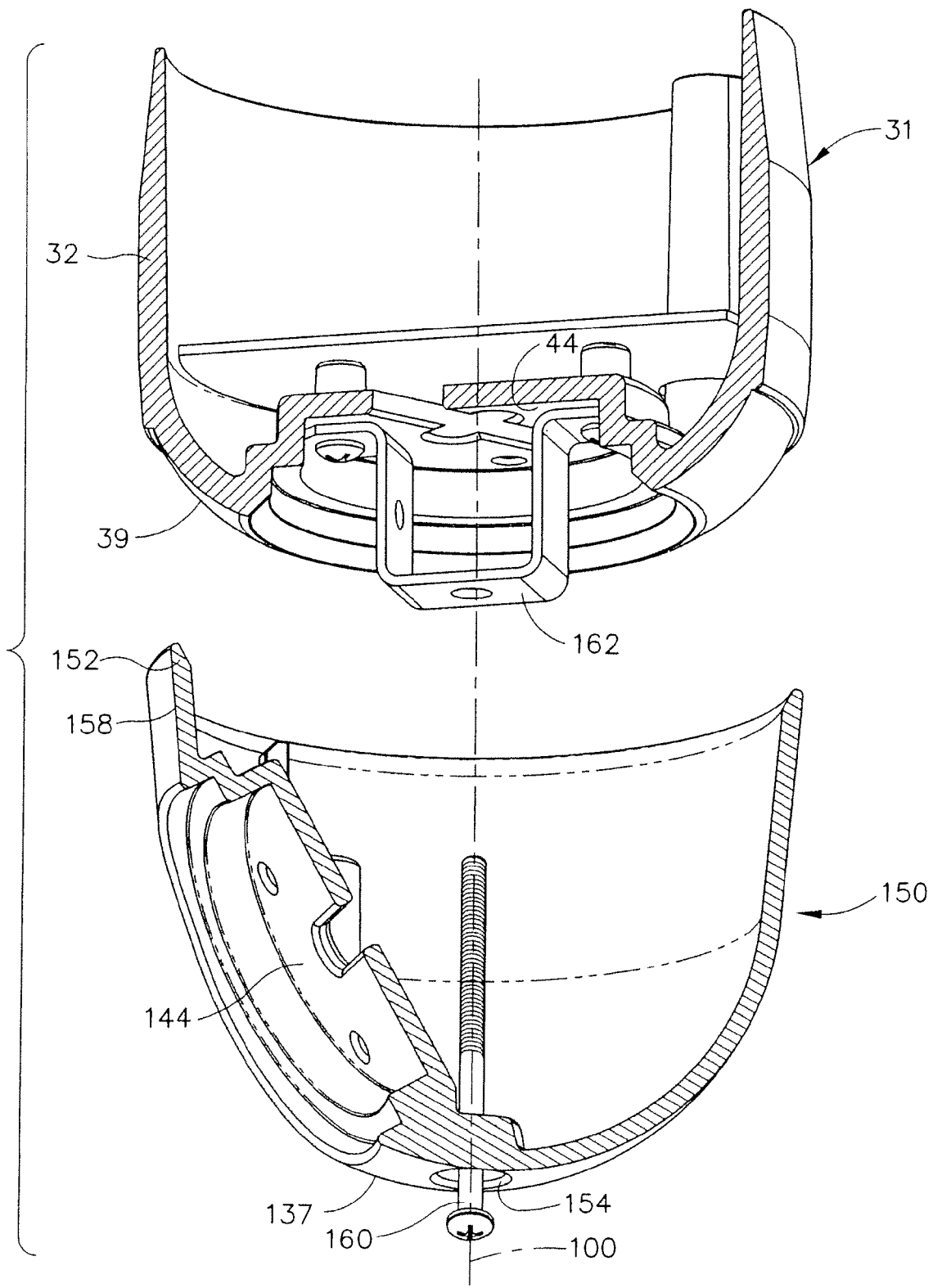
FIG. 6 shows a sectional, exploded view of the LED lamp device taken through line 6-6 of FIG. 5, showing an internal bracket and bolt for associating the neck base with the lamp head.

Another example of a lamp fixture is shown in a second embodiment of the invention. In the second embodiment shown in FIGS. 4-7, the LED lamp device 130 is comprised of the neck base 31 that has the shaped outside surface 34, including a tapered proximal outside surface 35, and a lamp head 150 that is moveably affixed to the distal end 37 of the adapter sleeve. The lamp head 150 has an annular wall 158 having an annular rim 152 that associates with a shoulder 39 on the distal end 37 of the annular wall 32 of the neck base 31, to permit rotation of the lamp head 150 around the centering line 100 of the neck base 31. The lamp head 150 is fixed to the neck base 31 for rotation around the centering line 100 by securement bolt 160 passing through hole 154 in the distal end 137 of the lamp head. The bolt 160 threads into securing bracket 162 mounted into the distal recess 44 of the neck base 31. As shown in FIG. 6, the securing bracket 162 is affixed to the distal recess 44 with bolts. The securement bolt 160 can be loosened sufficiently to permit rotation of the lamp head 150 around the centering line 100 relative to the stationary neck base 31, and then threaded down to fix the lamp head 150 against rotation. The lamp head 150 can therefore be rotated to provide the desired radial direction of the light emitted from the LED module.

Each of the annular rim 152 of the lamp head 150 and the shoulder 39 of the neck base 31 is configured and formed to provide a wide area of overlap and interface, thereby ensuring sufficient surface area between the two parts so that heat from the LED module 80 can pass to the adapter sleeve and on to the collar 10. Typically the interface is metal against metal, for example, aluminum against aluminum, to optimize heat transfer between the parts.

Figure 7:
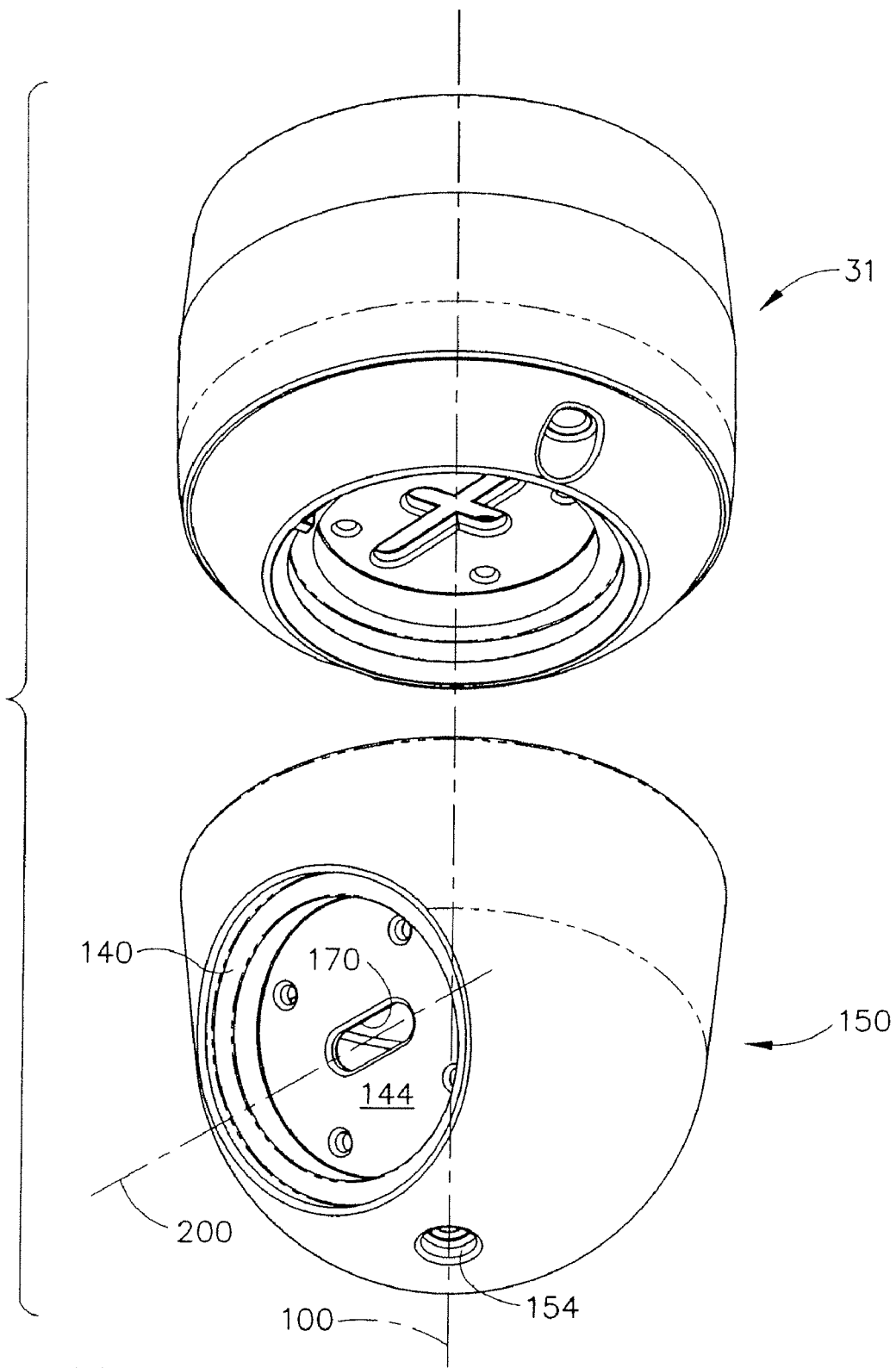
FIG. 7 shows an exploded view of the LED lamp device of FIG. 5.

The lamp head 150 has the first recess 144 formed in the distal surface to receive the LED module 80. As shown in FIGS. 5 and 7, the LED module 80 is disposed offset from the centerline 100 of the lamp head 150. The LED module 80 itself has a centerline 200 disposed at an angle θ to the axial centering line 100 of the adapter sleeve, the angle θ typically being from about 10° to about 70°.

As in the last embodiment, and as seen in FIG. 7, a second recess 140 is disposed at the distal end of the lamp head 150, concentric with the first recess 144 and substantially centered on the centerline 200 of the LED module 80 (similar to the recesses 40 and 44 of the first embodiment), for retaining the transparent lens 82 and LED module 80, respectively. In the floor of the recess 144 is an opening 170 through which pass electrical wiring for power and control of the LEDs.

Figure 8:
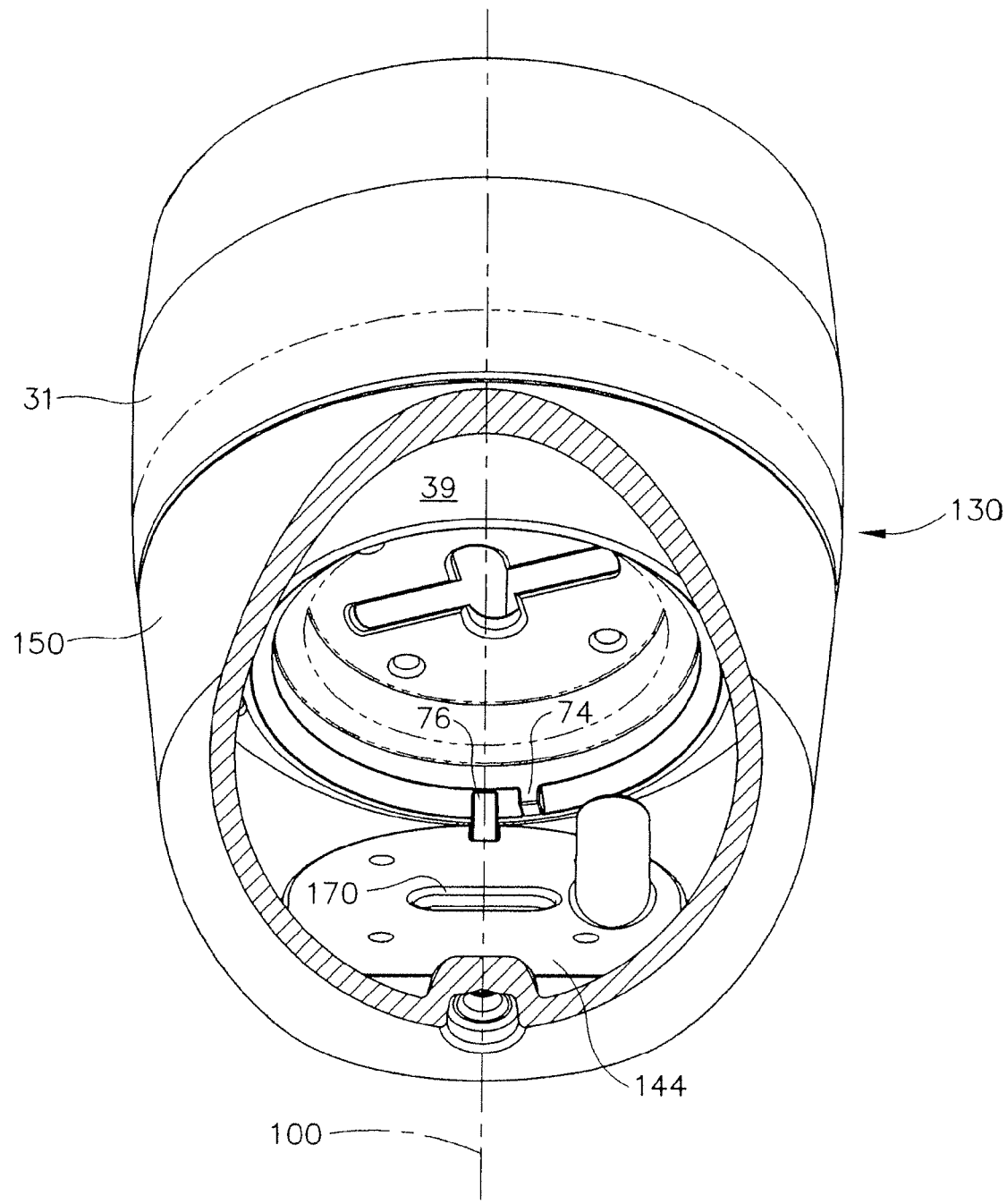
FIG. 8 shows a partial sectional view of the LED lamp device taken through line 8-8 of FIG. 5
Figure 9:
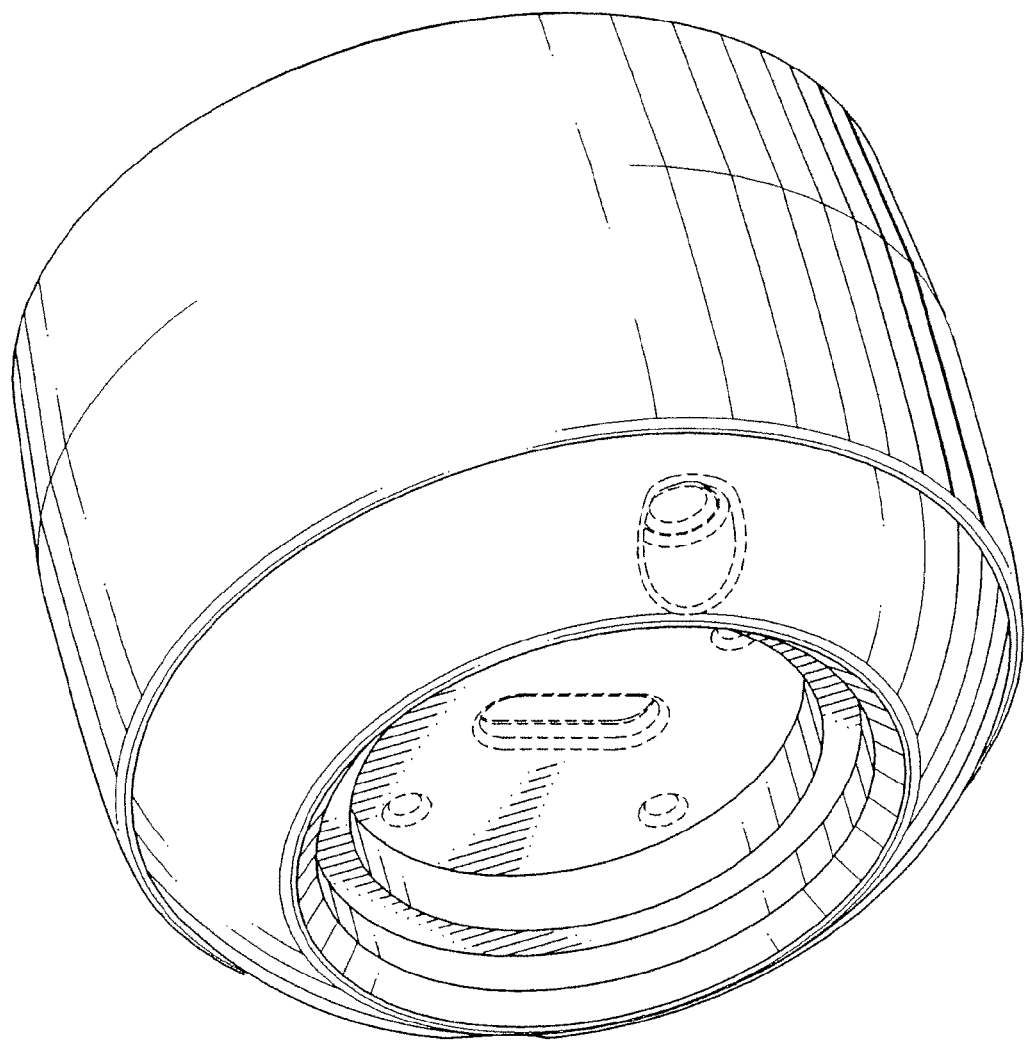
FIG. 9 is a perspective view of a first embodiment of the light device.
Figure 10:
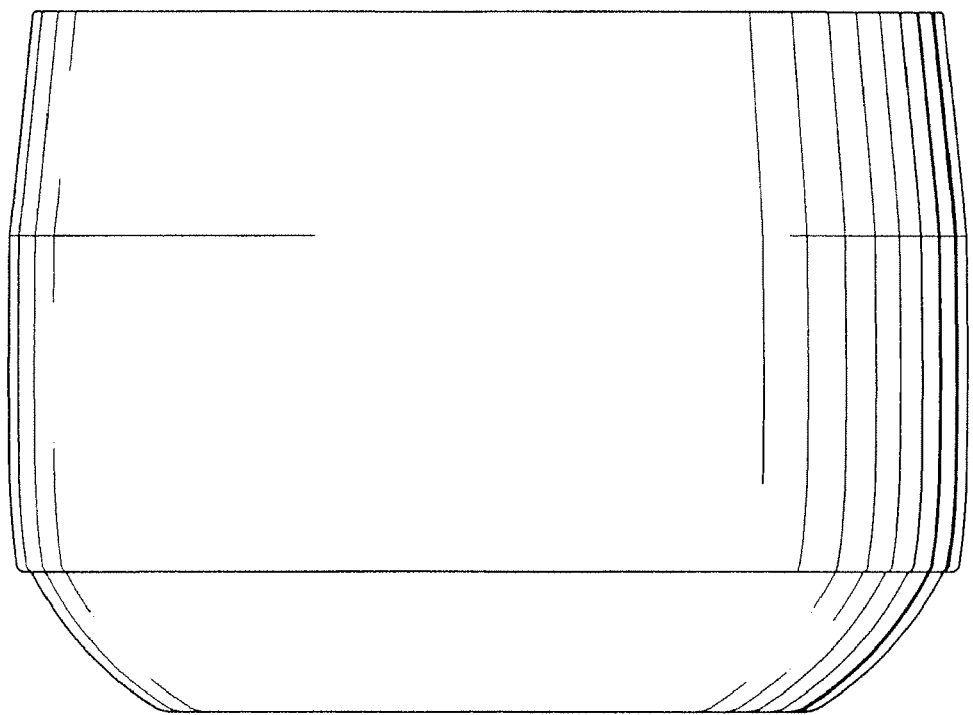
FIG. 10 is a front and back view of the first embodiment of the light device.
Figure 11:
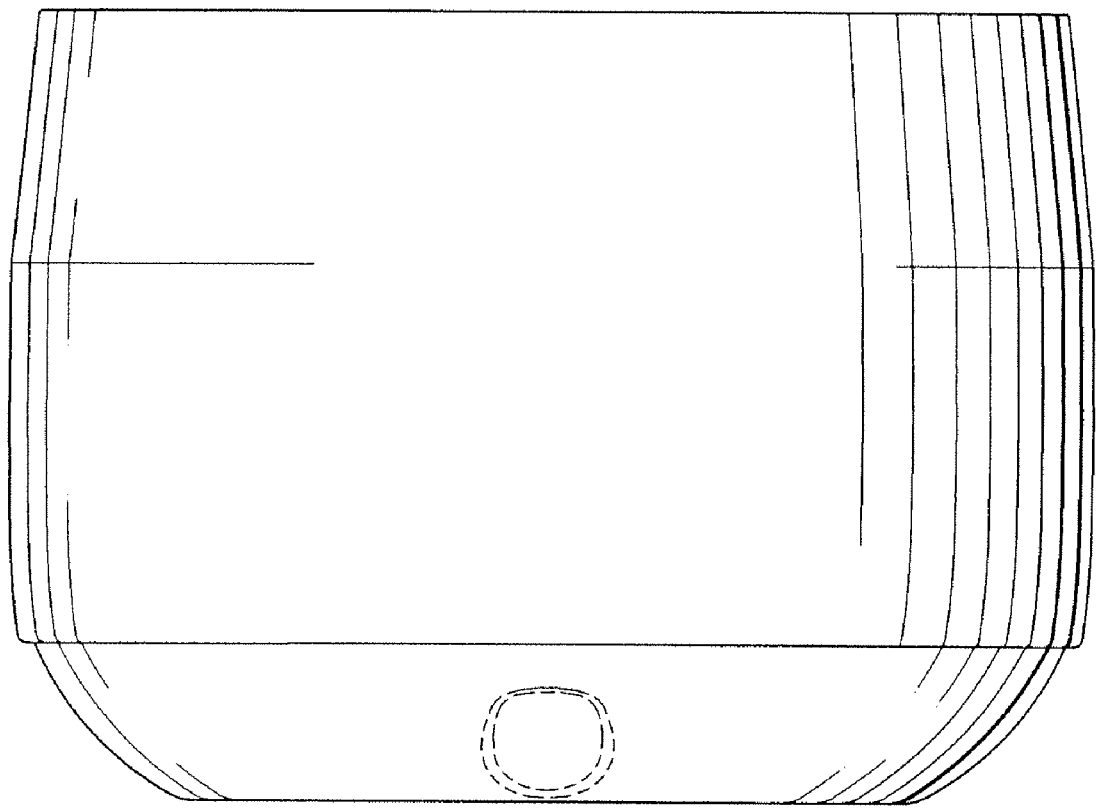
FIG. 11 is a right side and left side view of the first embodiment of the light device.
Figure 12:
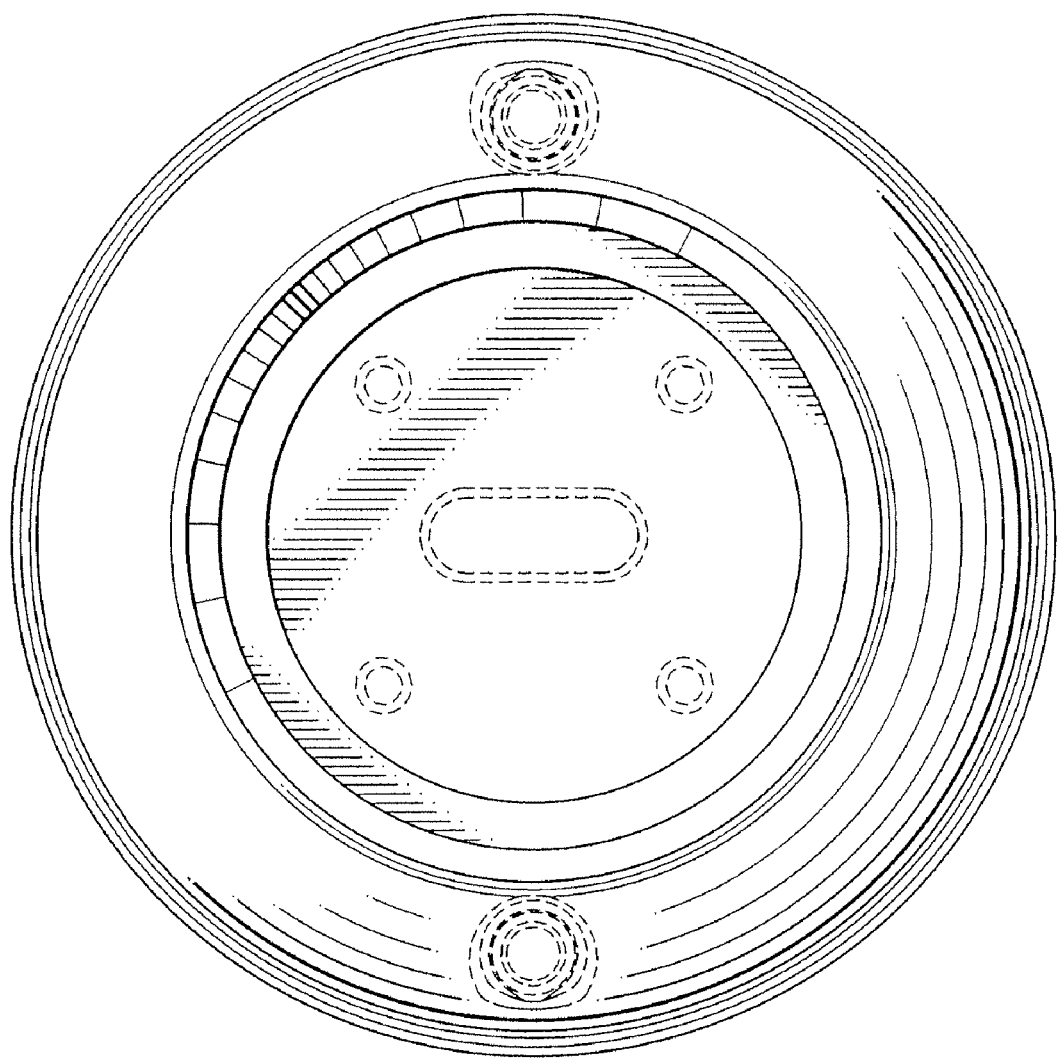
FIG. 12 is a top view of the first embodiment of the light device.
Figure 13:
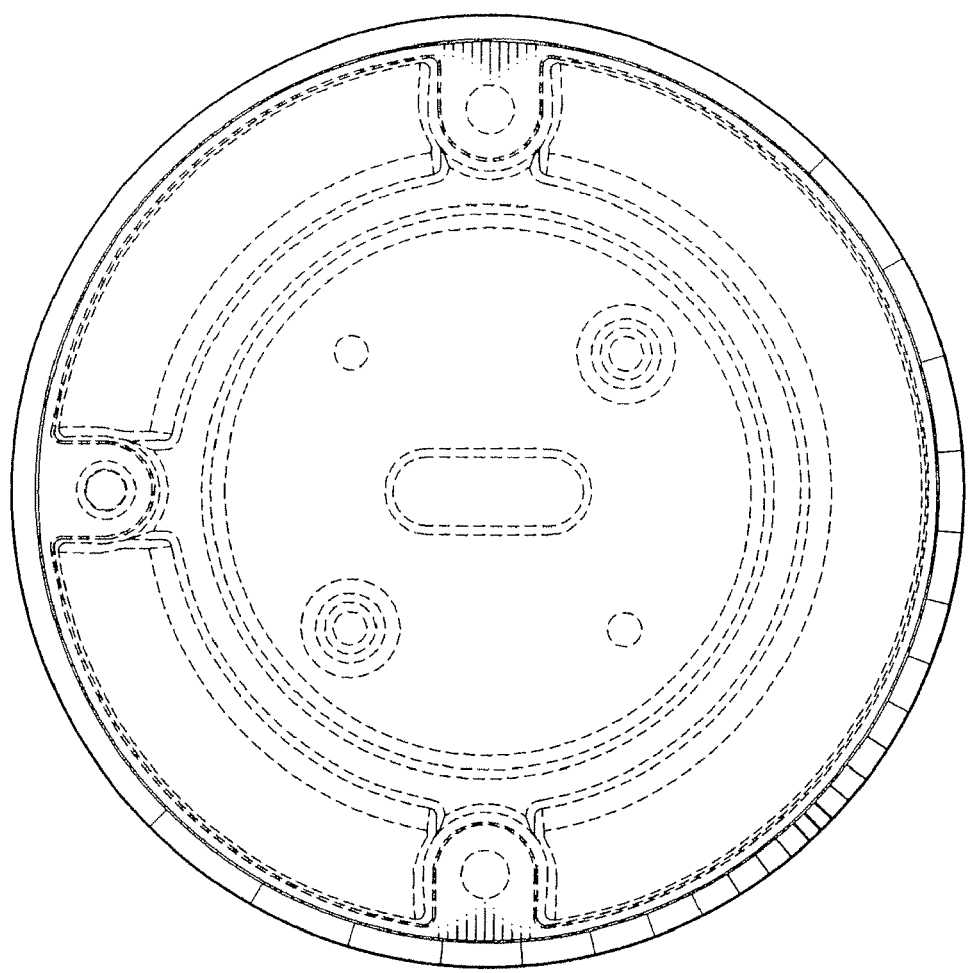
FIG. 13 is a bottom view of the first embodiment of the light device.
Figure 14:
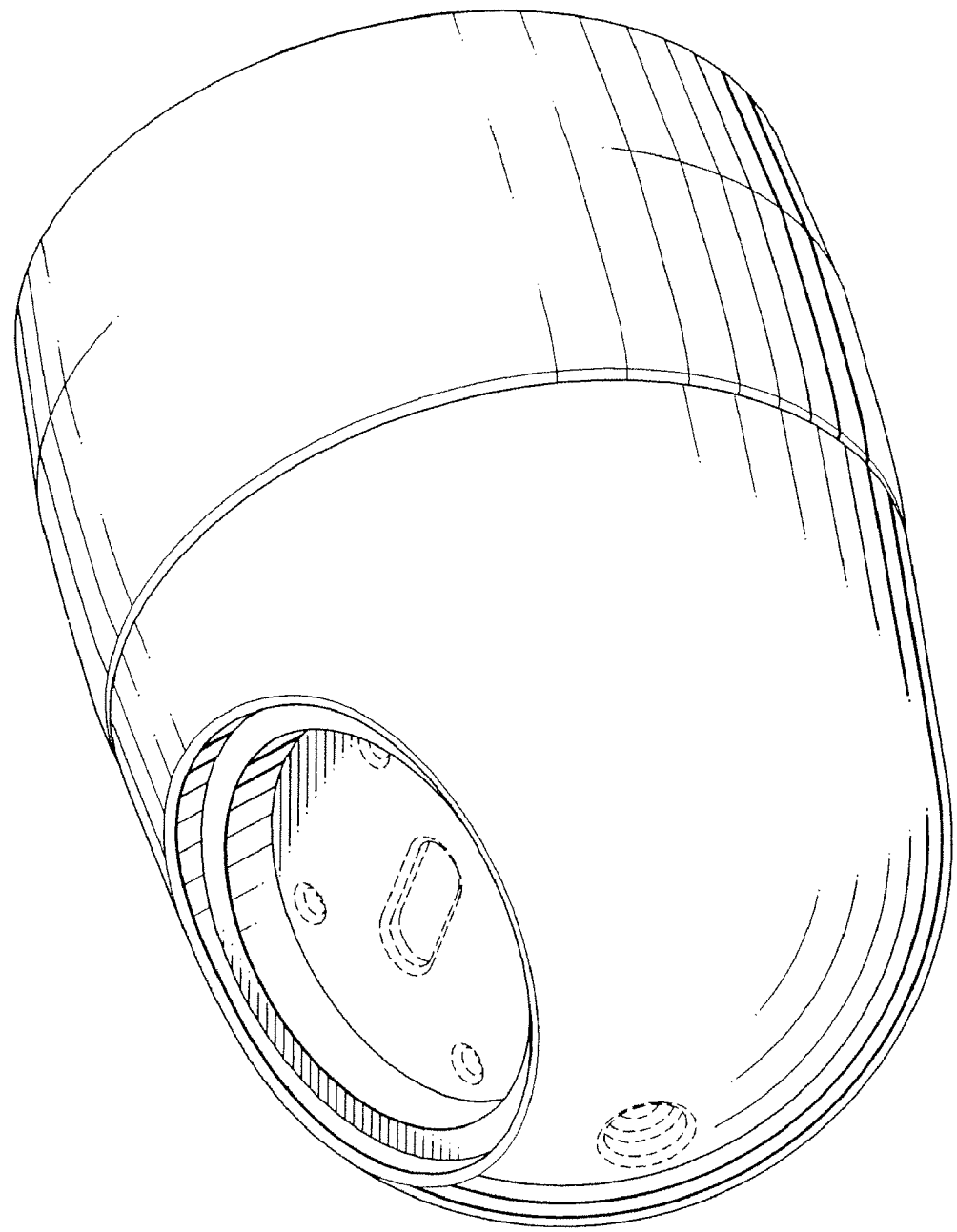
FIG. 14 is a perspective view of a second embodiment of the light device.
Figure 15:
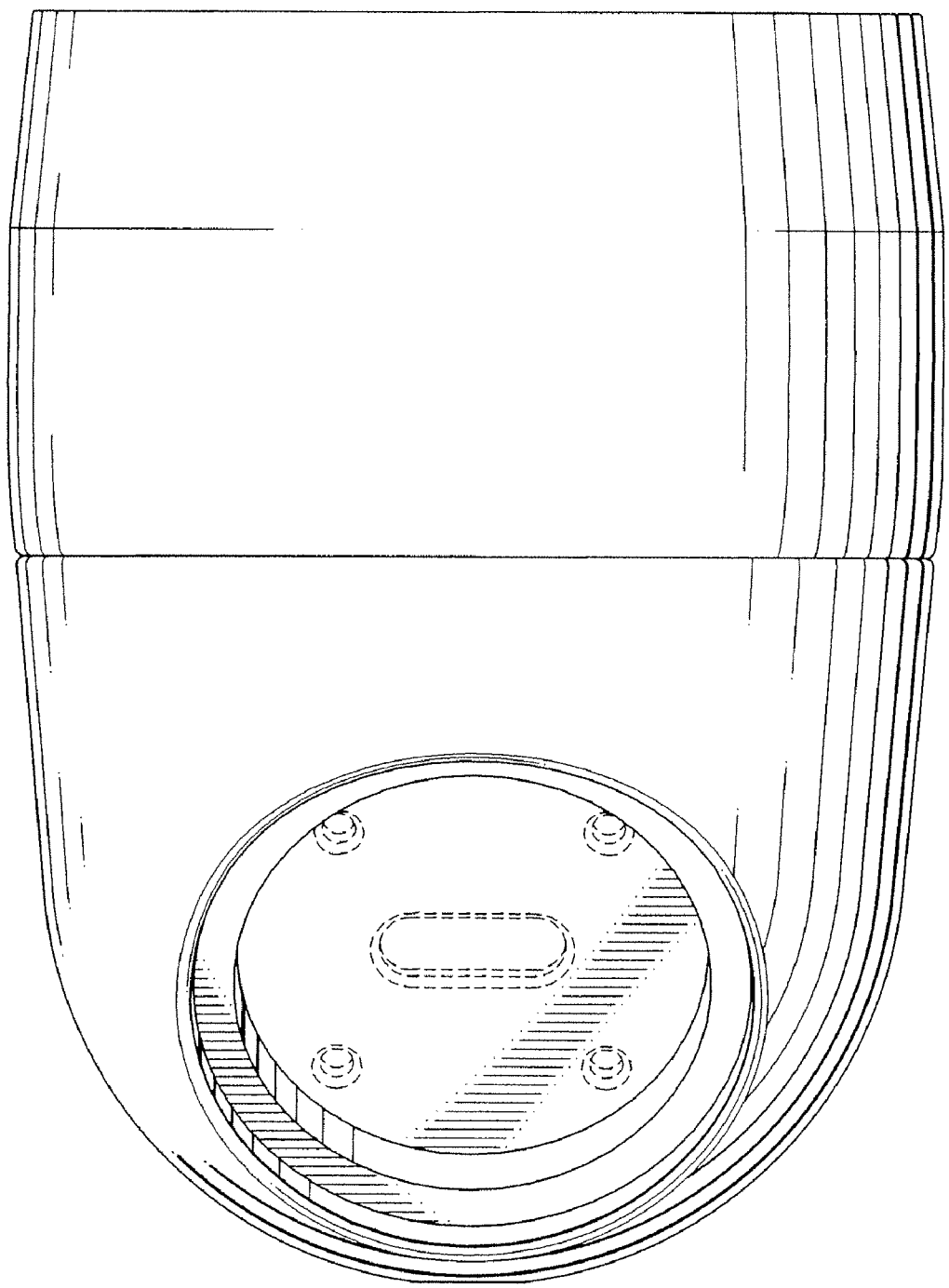
FIG. 15 is a front view of the second embodiment of the light device.
Figure 16:
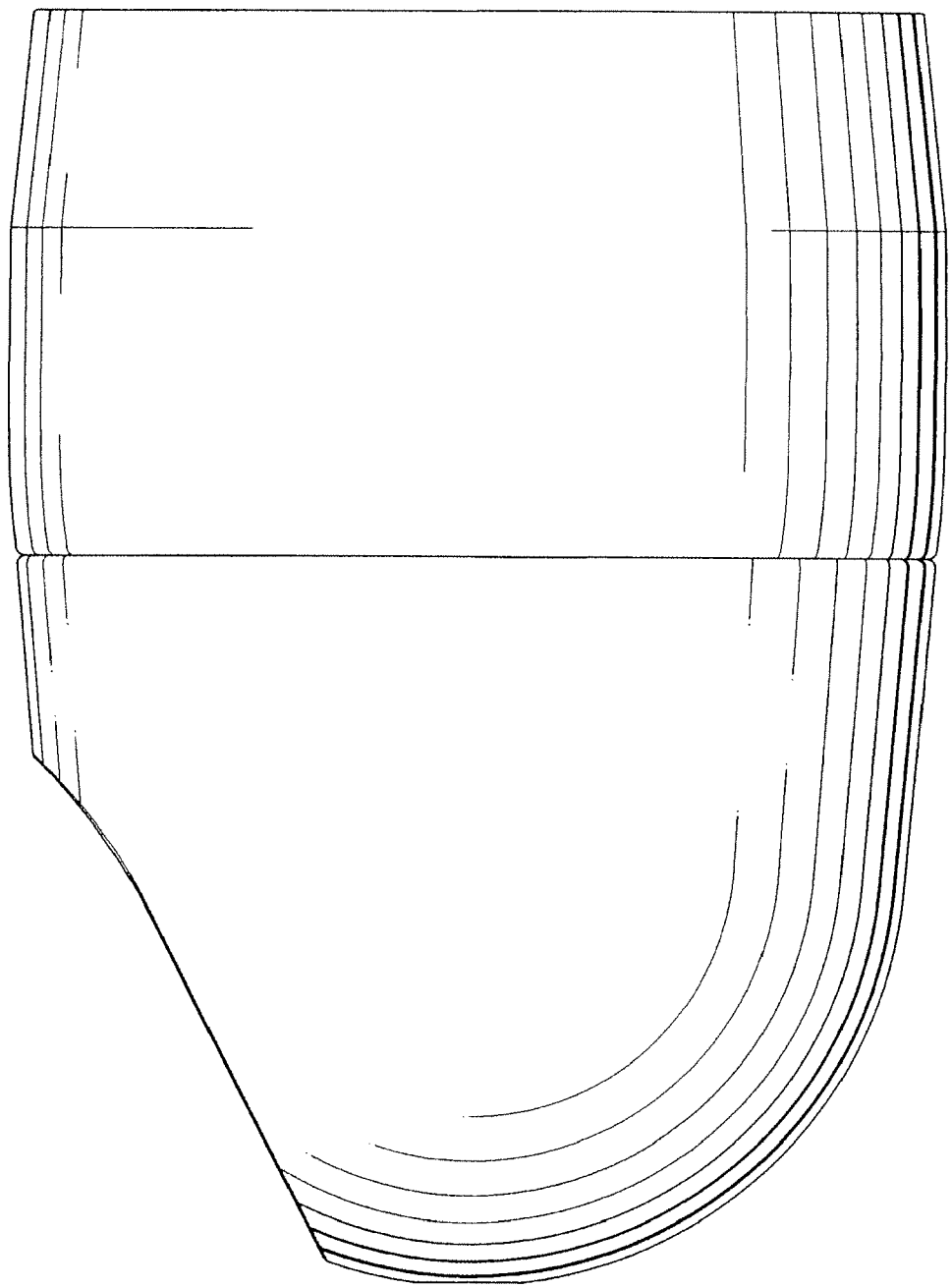
FIG. 16 is a right side view of the second embodiment of the light device; the left side view is the mirror image.
Figure 17:
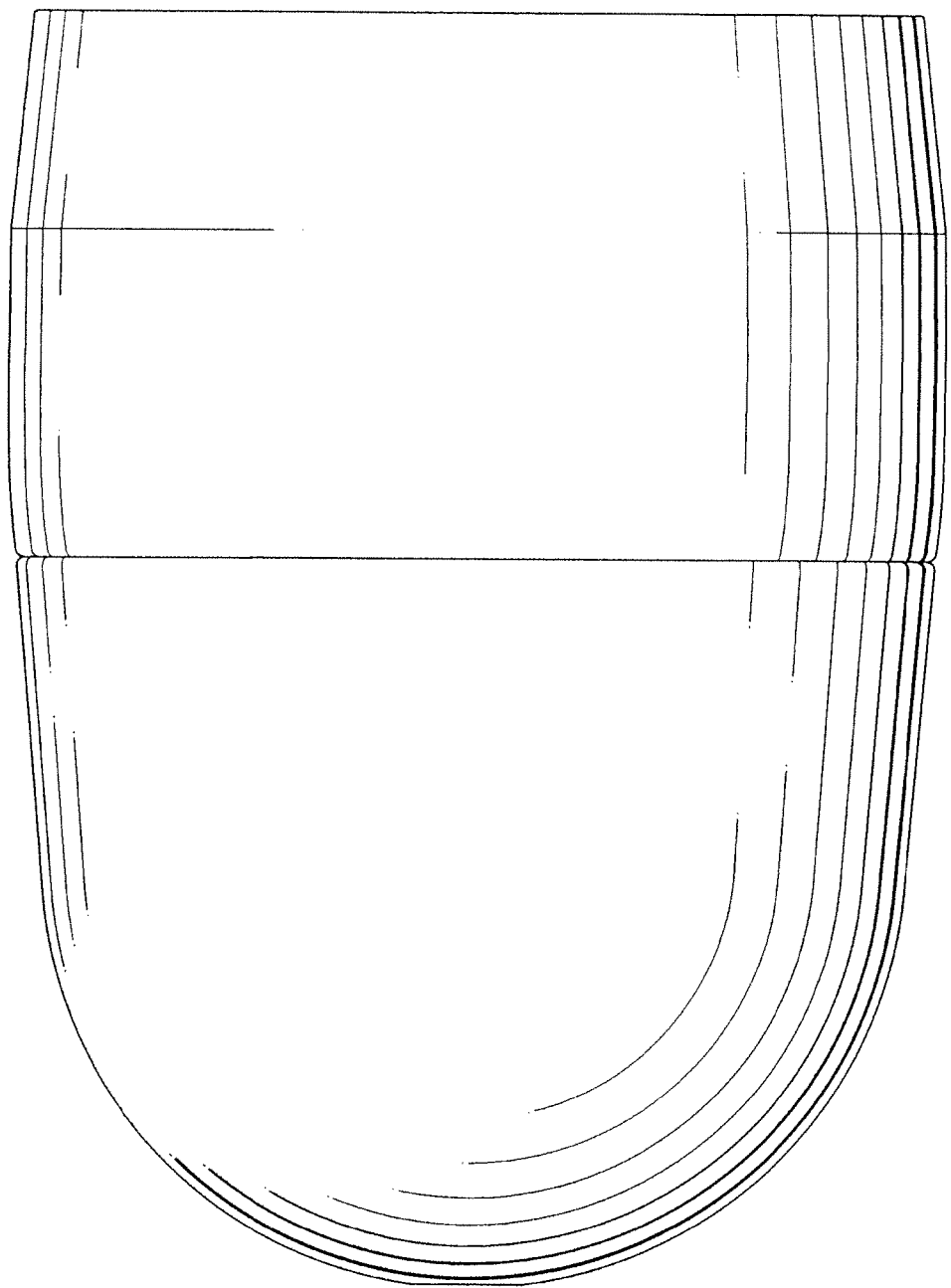
FIG. 17 is a back view of the second embodiment of the light device.
Figure 18:
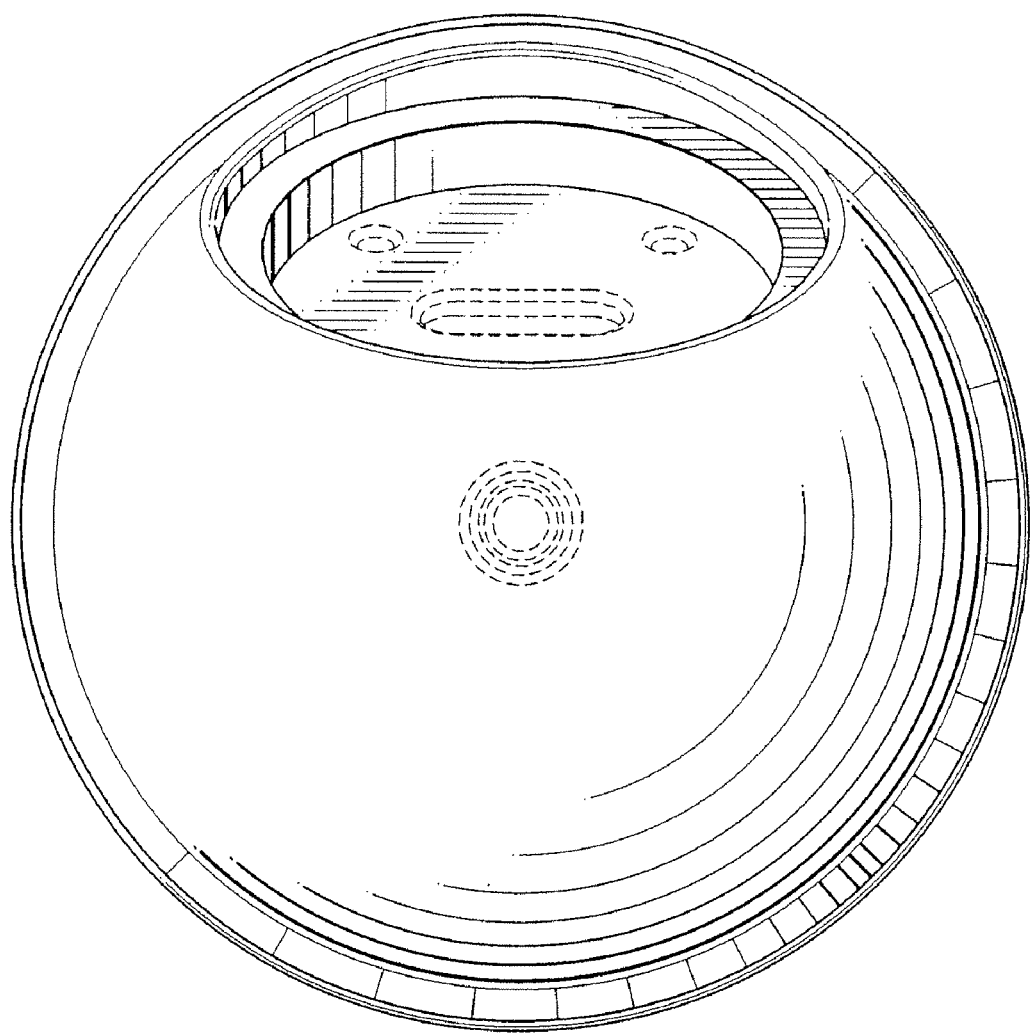
FIG. 18 is a top view of the second embodiment of the light device.
Figure 19:
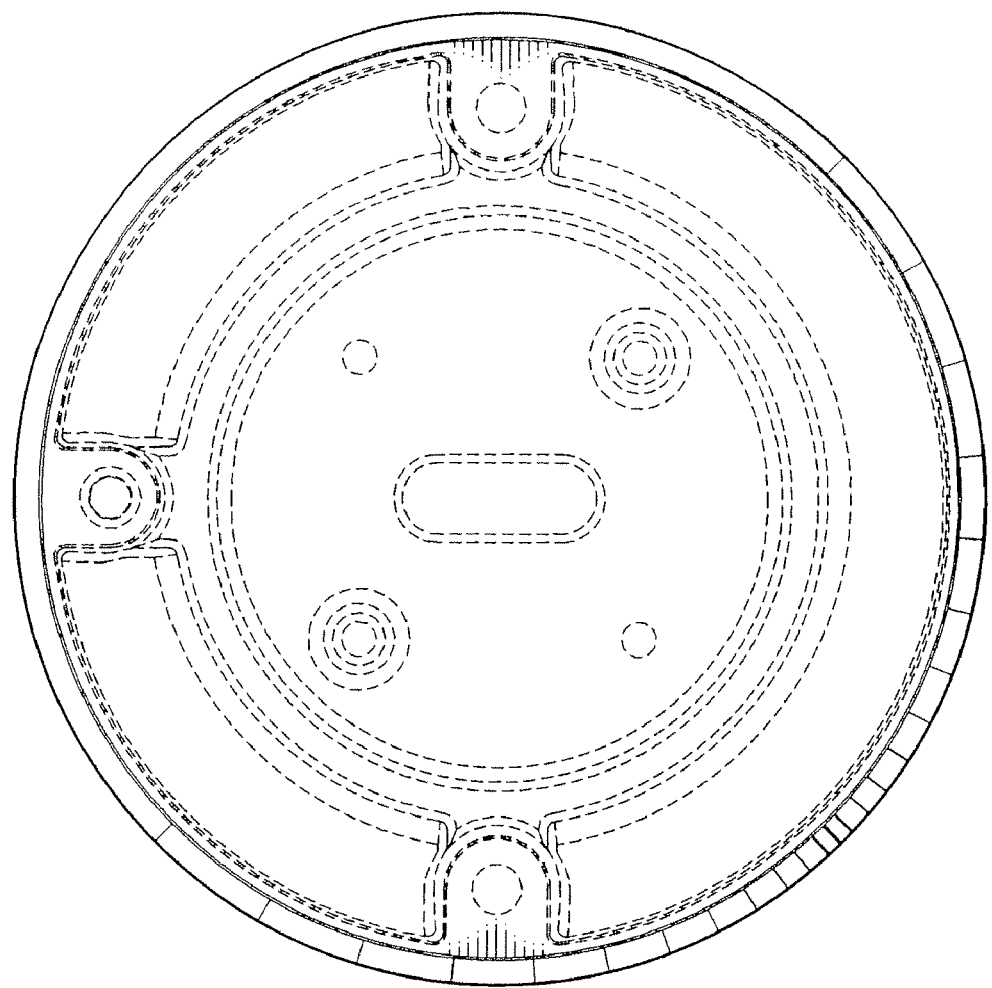
FIG. 19 is a bottom view of the second embodiment of the light device.
Figure 20:
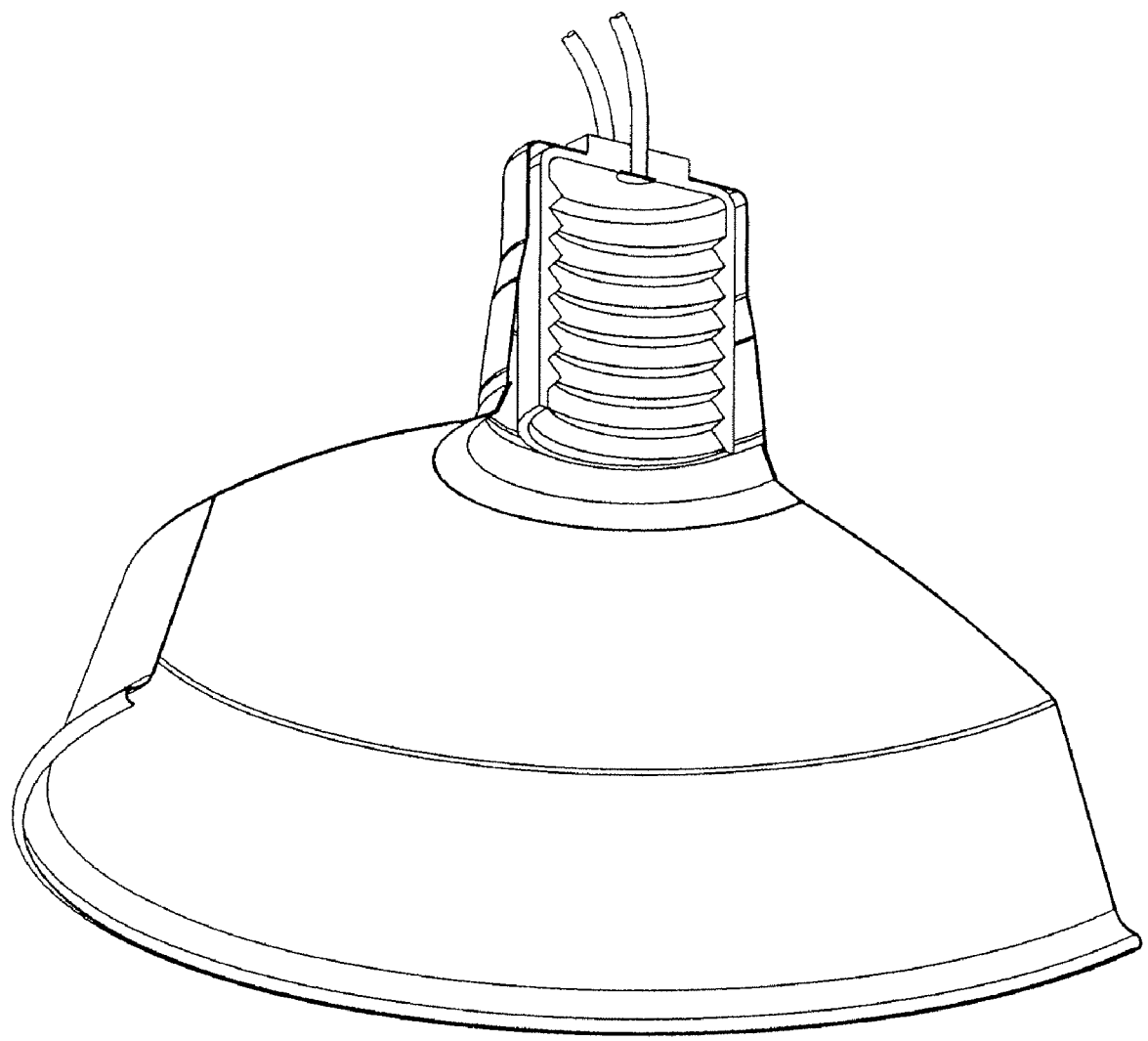
FIG. 20 is a sectional view of a light fixture and threaded lamp socket to be retrofitted as described in the present disclosure.

The LED lamp device 130 has a means for preventing over-rotation of the lamp head 150 about the neck base 31 that prevents the internal wiring of the LED module 80 from tangling. FIG. 8 shows an embodiment of an over-rotation prevention means consisting of a pair of rotation stops 74 and 76 that prevent the lamp head 150 from rotating more than 360 degrees around the neck base 31. The first rotation stop 74 is positioned on an inside surface of the shoulder 39 of the neck base 31, and the second rotation stop 76 is positioned on the underside of the floor of recess 144 of the lamp head 150. Other means for preventing over-rotation of the lamp head 150 can be used which are well known in the art.

The LED lamp device are typically made by casting aluminum by well known methods such as die casting, permanent mold casting or sand casting. Other metals can be used such as bronze and brass. The parts can also be formed by machining the metal stock. The parts can also be made of plastic materials that have high heat transfer values, by injection molding.

In the illustrated designs illustrated in FIGS. 9-19, the broken lines show environment, and form no part of the claimed design.

While the invention has been disclosed by reference to the details of preferred embodiments of the invention, it is to be understood that the disclosure is intended in an illustrative rather than in a limiting sense, as it is contemplated that modifications will readily occur to those skilled in the art, within the spirit of the invention and the scope of the appended claims.

I claim:

1. A light emitting diode (LED)-based lamp fixture securable to a structure having an electrical power source, comprising:
   1) a collar having an annular wall and a base securable to the structure,
   2) an LED lamp device comprising a neck base having an annular wall having a shaped outside surface that is placed into direct surface contact with the inner surface of the annular wall of the collar, to establish a heat-transferring interface between the LED lamp device and the collar, and having a distal end, and
   3) an LED module comprising at least one LED disposed at the distal end of the LED lamp device
   wherein the LED lamp device comprises a neck base having the shaped outside surface, and a lamp head moveably affixed to the distal end of the neck base, having formed therein a first recess to receive the LED module and a second recess formed to a depth less than the depth of the first recess, and being registered over the first recess, and further comprising a transparent lens disposed in the second recess.

2. A method for retrofitting an existing lamp fixture to replace a threaded lamp socket with an LED-based lamp assembly, the lamp fixture having a collar having an annular wall with an inner wall surface, and a base to which the threaded lamp socket is secured for attaching the lamp fixture to a structure, and for communicating electrical power from an electrical power source to the threaded socket lamp, the method comprising the steps of:
   a. removing the threaded lamp socket from the collar;
   b. providing an LED lamp device having an annular wall having a shaped outside annular surface and an LED module, wherein the outside surface of the annular wall has a first surface portion that is substantially cylindrical about a centerline of the device, and a second surface portion that has at least one frustoconical surface that tapers toward the centerline;
   c. affixing the LED lamp device to the lamp fixture, wherein the first portion and the second portion are placed inside the collar and at least a portion of the shaped outside annular surface is placed into direct surface contact with the inner surface of the annular wall of the collar, to establish a heat-transferring interface between the annular wall of the lamp device and the collar, and
   d. connecting the electrical power source to the LED module.

3. A method for retrofitting an existing lamp fixture to replace a threaded lamp socket with an LED-based lamp assembly, the lamp fixture having a collar having an annular wall with an inner wall surface, and a base to which the threaded lamp socket is secured for attaching the lamp fixture to a structure, and for communicating electrical power from an electrical power source to the threaded socket lamp, the method comprising the steps of:
   a. removing the threaded lamp socket from the collar;
   b. providing an LED lamp device having an annular wall having a shaped outside annular surface and an LED module, the LED lamp device comprises a neck base having the shaped outside surface, and a lamp head moveably affixed to the distal end of the neck base, having formed therein the first recess to receive the LED module;
   c. affixing the LED lamp device to the lamp fixture, wherein the shaped outside annular surface is placed into direct surface contact with the inner surface of the annular wall of the collar, to establish a heat-transferring interface between the annular wall of the lamp device and the collar, and
   d. connecting the electrical power source to the LED module.

4. A lamp fixture securable to a structure having an electrical power source, comprising:
   1) a collar having an annular wall and a base securable to the structure;
   2) a shade having a frustum extending from a distal end of the collar, where the shade is at least partially in contact with freely-flowable air for increased heat dissipation;
   3) a replaceable lamp device comprising a neck base having an annular wall having a shaped outside surface that is placed into direct surface contact with an inner surface of the annular wall of the collar, to establish a heat-transferring interface between the lamp device and the collar to dissipate heat through the shade, and having a distal end; and
   4) a light module comprising at least one light source disposed at the distal end of the lamp device;
   wherein the lamp device further has a first recessed level formed into the distal end to receive the light module and the first recessed level has an elongated slot having a length and a width sufficiently sized to allow passing therethrough the light module, and having at least one secondary slot extending transversely from a middle portion along the length of the elongated slot.

5. A lamp fixture securable to a structure having an electrical power source, comprising:
   a collar having an annular wall and a base securable to the structure;
   a lamp device comprising a neck base having an annular wall having a shaped outside surface that is placed into direct surface contact with an inner surface of the annular wall of the collar, to establish a heat-transferring interface between the lamp device and the collar, and having a distal end;
   a light module comprising at least one light source disposed at the distal end of the lamp device; and
   wherein the lamp device further comprises a power unit connected to the electrical power source and a control unit for the light module, where the power unit and control unit are in sufficient thermal communication with the direct surface contact to transfer heat generated in the power unit and control unit;

wherein the lamp device further has a first recessed level formed into the distal end to receive the light module and the first recessed level has an elongated slot having a length and a width sufficiently sized to allow passing therethrough the light module, and having at least one secondary slot extending transversely from a middle portion along the length of the elongated slot.

* * * * *